United States Patent
Sordello

[11] 3,723,766
[45] Mar. 27, 1973

[54] PEAK DETECTOR
[75] Inventor: Frank J. Sordello, San Jose, Calif.
[73] Assignee: Information Storage Systems, Inc., Cupertino, Calif.
[22] Filed: Aug. 16, 1971
[21] Appl. No.: 171,979

[52] U.S. Cl.............307/235 A, 307/290, 328/115, 330/30 D
[51] Int. Cl..............................................H03k 5/20
[58] Field of Search.............307/235 R, 290, 235 A; 328/115-117, 150; 330/30 D

[56] References Cited

UNITED STATES PATENTS

| | | | |
|---|---|---|---|
| 2,448,718 | 9/1948 | Koulicovitch | 328/150 |
| 3,569,739 | 3/1971 | Stolman | 307/235 R |
| 3,612,912 | 10/1971 | Schwartz | 307/235 R |

*Primary Examiner*—John Zazworsky
*Attorney*—C. Michael Zimmerman et al.

[57] ABSTRACT

A circuit for detecting the peak of a pulse for purposes of reference, or the like. The circuit features a modified Schmidt trigger which is arranged to generate a square wave pulse having a leading edge coinciding with the peak of an incoming pulse from, for example, a once-around transducer associated with a magnetic disc memory.

9 Claims, 2 Drawing Figures

PATENTED MAR 27 1973                                              3,723,766
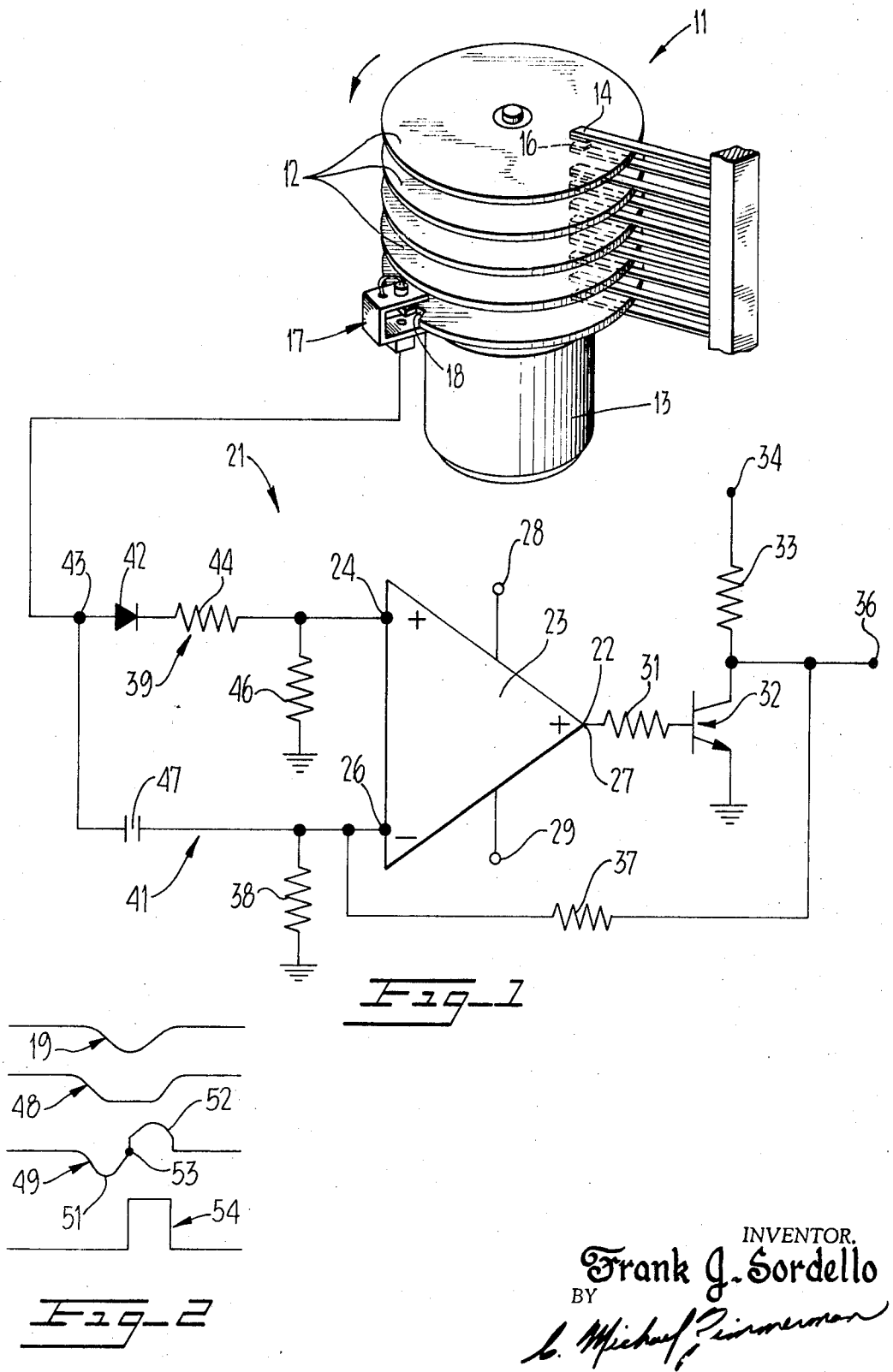
Fig_1
Fig_2
INVENTOR.
Frank J. Sordello
BY
ATTORNEY

PEAK DETECTOR

BACKGROUND OF THE INVENTION

In numerous applications it is necessary to accurately determine the peak of a pulse with respect to time. For example, in a disc pack magnetic memory, a once-around transducer is employed to generate a pulse each revolution of the disc pack in order to establish a point of reference from which the rotational position of the discs can be determined at any given time. In this manner magnetic read and write heads associated with the discs may be actuated to magnetically read out information from, or write information on, predetermined locations of the discs. In order that such locations be precisely determined it is of course necessary that the locations of the once around reference pulse be accurately established. The reference pulses are typically relatively broad with a peak that is not precisely defined. Accordingly, it is the usual practice to apply the pulses to a peak detector circuit for generating pulses having precise leading edges coinciding with the peaks of the reference pulses. Heretofore such peak detectors have been relatively complex and therefore overly costly.

SUMMARY OF THE INVENTION

The general object of the present invention is to provide a pulse detector of relatively simple and inexpensive design for generating a pulse having a detectable leading edge substantially precisely coinciding with the peak of an input pulse.

In the accomplishment of the foregoing and other objects and advantages, a peak detector in accordance with the present invention basically comprises a Schmidt trigger circuit having first and second comparator input terminals and an output terminal, the circuit being arranged to abruptly initiate a detection pulse responsive to one of the input terminals being relatively more positive than the other and terminate the detection pulse responsive to the other input terminal become relatively more positive than the first. A clipper is coupled to one of the input terminals and a differentiator is coupled to the other, and the inputs of the clipper and differentiator are commonly connected to a signal input terminal for receiving the pulses whose peaks are to be detected. The clipper is such as to clip an incoming signal pulse at a predetermined level and apply the clipped pulse to one of the input terminals of the trigger circuit. At the same time the differentiator differentiates the signal pulse to apply a substantially sinusoidal waveform to the other input terminal of the trigger circuit. The latter waveform has an initial peak in one direction which merges with a peak in the other direction through a crossover point that corresponds to the peak of the signal pulse. As a result, one of the input terminals is made relatively positive with respect to the other input terminal during the first portion of the differentiated waveform and is at a relative zero at the time such waveform approaches the crossover point towards the opposite direction. Consequently, at substantially the instant that the waveform traverses the crossover point and biases the other input terminal oppositely with respect to the input terminal to which the clipped pulse is applied, a detection pulse in the form of a square wave pulse is initiated at the output of the trigger circuit, the leading edge of which pulse substantially precisely coincides with the peak of the signal pulse. The detection pulse is terminated in response to the clipped pulse reverting from its predetermined level toward its original bias and the termination of the differentiated pulse.

BRIEF DESCRIPTION OF THE DRAWING

FIG. 1 is a schematic circuit diagram of a peak detector in accordance with the present invention, depicted in association with a stacked magnetic disc memory to provide a precise reference pulse from which rotational positions of the discs can be precisely determined.

FIG. 2 is a graphical representation of time coinciding waveforms which exist at various points of the circuit of FIG. 1.

DETAILED DESCRIPTION OF THE PREFERRED EMBODIMENT

Referring now to FIG. 1 in detail, there is shown a disc pack magnetic memory 11 including a pack of coaxially spaced magnetic discs 12 coupled to a drive motor 13 for rotating same. Pairs of magnetic read and write heads 14 and 16 are interposed between the discs adjacent the opposite faces thereof, and such heads are arranged for selective translation radially of the discs by conventional indexing means (not shown). The discs may consequently be rotated and the heads appropriately indexed radially to provide access to predetermined points on the faces of the discs in order to write information thereon or read such information therefrom. In order that the disc positions may be rotationally located, a once-around transducer 17 is associated with the disc 12 to generate a reference pulse per each disc revolution, the time of occurrence of such pulse corresponding to the time the discs are in a predetermined rotational position determined by a notch 18 in the edge of one of the discs passing the transducer. To accurately determine the disc position it is necessary that the location of the peak of the reference pulse be precisely detected. Unfortunately the reference pulse is typically relatively broad such that the peak is not very precisely defined. More particularly, the transducer pulse is usually of the form depicted at 19 in FIG. 2. In this regard, the reference pulse 19 gradually drops from a positive bias level of, for example, +5 volts to a relatively blunt negative peak having a level of, for example, −1 volt.

In order to detect the location of the peak of the reference pulse 19 there is provided a pulse peak detector 21 in accordance with the present invention which is coupled in receiving relation to the output of transducer 17, and will be observed to be of extremely simple inexpensive design. More particularly, the peak detector 21 includes a Schmidt trigger circuit 22 which, in the illustrated case, comprises a difference amplifier or level comparator 23 having a pair of input terminals 24 and 26, an output terminal 27, and positive and negative power supply terminals 28 and 29 which may have values, for example, of +12 and −6 volts respectively. The comparator output terminal 27 is coupled by means of resistor 31 to the base of a switching transistor 32 having its emitter connected to ground and its collector coupled by means of a load resistor 33 to a bias terminal 34. In the illustrated case, the transistor is of type NPN and a positive voltage of, for example, +5 volts is at the power supply terminal 34 such that the transistor is rendered conducting when a positive potential appears at the comparator output terminal and non-conducting when a negative potential appears thereat. An output terminal 36 is connected to the collector of the transistor, and when the transistor conducts the output terminal is at substantially zero volts while being at the positive potential of power supply terminal 34 (e.g., about +5 volts) when the transistor is non-conducting. To complete trigger circuit 22, a feedback resistor 37 is connected between output terminal 36 and comparator input terminal 26, and a second resistor 38, hereinafter called a load resistor, is connected between such input terminal and ground.

In the operation of the trigger circuit 22, transistor 32 is switched on when terminal 24 is positive with respect to terminal 26 and switched off when terminal 26 is positive with respect to terminal 24. Thus, a positive going square pulse is initiated in response to terminal 26 going relatively more positive than terminal 24, and the pulse terminates when the polarity conditions of the terminals are reversed.

In accordance with the particularly salient aspects of the invention, a clipper 39 is employed to couple the output of transducer 17 to terminal 24, and a differentiator 41 couples the transducer output to terminal 26 of the comparator 23 of Schmidt trigger circuit 22. In this regard, the clipper comprises a diode 42 having its anode connected to an input junction point 43 which is connected to the transducer output, and its cathode connected by means of a divider resistor 44 to input terminal 24. A second divider resistor 46 couples terminal 24 to ground to complete the clipper. The differentiator 41 is then provided by means of a capacitor 47 coupled between input junction point 43 and terminal 26. The capacitor in combination with load resistor 38 in parallel with feedback resistor 37 of the trigger circuit, therefore comprise the differentiator.

It is thus to be noted that in response to the normal positive bias of the reference pulses 19 from transducer 17, the diode 42 is conducting to thereby substantially divide the positive bias between the divider resistors 44 and 46. Terminal 24 is thus at a positive potential while substantially zero potential appears at terminal 26. As a result, transistor 32 is conducting such that output terminal 36 is at zero volts and no voltage is fed back to terminal 26. However, when a negative going reference pulse 19 appears, diode 42 is rendered non-conducting when pulse 19 approaches a negative value and the drop across the diode becomes back biasing. With the diode non-conducting, terminal 24 is placed at ground potential, or zero volts. As a result, the positive, negative going pulse 19 is clipped at zero volts and appears at terminal 24 as a clipped pulse having the waveform indicated at 48 in FIG. 2. At the same time capacitor 47 and resistor 38 differentiate the pulse 19 to provide the differentiated waveform 49 at terminal 26. The latter waveform includes an initial negative peak 51 which merges with a terminal positive peak 52 through a zero crossover point 53. It should be noted that the waveforms 48 and 49 are initiated and terminated substantially in time correspondence with the initiation and termination of pulse 19. It is of more importance to note that zero crossover point 53 of waveform 49 coincides with the peak of pulse 19 such that this waveform becomes positive substantially at the crossover point.

Considering now in detail the operation of trigger circuit 22 with the waveforms 48 and 49 at terminals 24 and 26 responsive to the occurrence of pulse 19, it is to be noted that the clipped pulse is at a positive value and the differentiated waveform is beginning its negative swing 51 during the initial stages of the pulse cycle. Thus, at this time terminal 24 is positive with respect to terminal 26, terminal 27 remains positive, transistor 32 remains on, and the potential at output terminal 36 continues to be zero volts. When waveform 48 is initially clipped at zero volts, the differentiated waveform 49 is still undergoing its negative peak 51 such that terminal 24 is still relatively more positive than terminal 26 and the foregoing conditions are unchanged. However, when the differentiated waveform traverses zero crossover point 53, terminal 26 goes positive, while terminal 24 remains clipped at zero volts. Now since terminal 24 is relatively more negative than terminal 26, terminal 27 abruptly goes negative to turn off transistor 32 substantially in time correspondence with the zero crossover point and thus the peak of reference pulse 19. As a result, the potential at output terminal 36 abruptly shifts towards the positive potential of power supply 34, and a square pulse 54 is initiated with its leading edge substantially coinciding with the peak of the reference pulse. The positive output also effects a biasing of terminal 26 through resistor 37 in the positive direction to sustain the foregoing non-conducting state of the transistor. This biasing is superimposed on the differentiated waveform and is represented by the vertical offset of the positive portion of such waveform.

Termination of square pulse 54 is effected upon the trailing edge of clipped pulse 48 going positive and differentiated waveform 49 approaching the level to which it is biased by the positive output, thereby placing terminal 24 at a relatively more positive potential than terminal 26 and turning on transistor 32, whereby the potential at output terminal 36 is abruptly returned to zero volts.

For input reference pulses 19 negatively swinging from +5 volts continuous bias to a peak of −1 volt, representative parameters for the peak detector 21 hereinbefore described are as follows:

| | |
|---|---|
| Comparator 23 | type 710 |
| Diode 42 | IN3064 |
| Transistor 32 | type NPN |
| Resistor 31 | 2K |
| Resistor 33 | 620 ohms |
| Resistor 37 | 4.3K |
| Resistor 38,44,46 | 1K |
| Capacitor 47 | 1,000 pf |
| Power supply terminal 28 | +12 volts |
| Power supply terminal 29 | −6 volts |
| Power supply terminal 34 | +5 volts |

Although the invention has been hereinbefore described and illustrated in the accompanying drawing, it will be appreciated that various modifications and changes may be made therein without departing from the true spirit and scope of the invention, and thus it is not intended to limit the invention except by the terms of the appended claims.

I claim:

1. A peak detector comprising a Schmidt trigger circuit having first and second comparator input terminals and a detector output terminal, said circuit abruptly initiating generation of a pulse having a detectable leading edge at said output terminal responsive to said second input terminal being relatively more positive than said first input terminal and terminating said pulse responsive to said first input terminal being relatively more positive than said second input terminal, means coupling one of said first and second comparator input terminals to a signal input terminal adapted to receive input pulses deviating between a continuous bias and a pulse peak level, said means clipping said input pulses at a predetermined voltage level and applying the clipped pulses to said one of said first and second comparator input terminals, and a differentiator coupling said signal input terminal to the other of said first and second comparator input terminals, said differentiator applying a differentiated waveform of said input pulses to said other comparator input terminal having an initial peak in one direction merging with a peak in the opposite direction through a crossover point coinciding with the peak of each of said input pulses whereby said trigger circuit generates pulses at said output terminal having leading edges in time correspondence with said peaks of said input pulses.

2. A peak detector according to claim 1, further defined by said means coupling one of said first and second comparator input terminals to said signal terminal being a clipper comprising a diode and first and second divider resistors, the anode of said diode being connected to said signal input terminal and said first resistor connecting the cathode thereof to said first comparator input terminal, said second resistor being connected between said first comparator input terminal and ground.

3. A peak detector according to claim 1, further defined by said differentiator comprising a capacitor coupling said signal input terminal to said other of said first and second comparator input terminals, and a resistor connected between said other of said first and second comparator input terminals and ground.

4. A peak detector according to claim 2, further defined by said differentiator comprising a capacitor coupling said signal input terminal to said second comparator input terminal, and a third resistor connected between said second comparator input terminal and ground.

5. A peak detector according to claim 1, further defined by said trigger circuit comprising a level comparator having input terminals defining said first and second comparator input terminals and having a comparator output terminal, said comparator generating a positive potential at said comparator output terminal responsive to said second comparator input terminal being at a relatively more positive potential than said first comparator input terminal, said comparator generating a negative potential at said comparator output terminal responsive to said first comparator output terminal responsive to said first comparator input terminal being at a relatively more positive potential than said second comparator input terminal, a NPN transistor having a base, emitter, and collector, said base coupled to said comparator output terminal, said emitter connected to ground, said collector coupled by a resistor to a positive power supply terminal, said detector output terminal connected to said collector, and resistive feedback means coupling said detector output terminal to said second comparator input terminal.

6. A peak detector according to claim 5, further defined by said feedback means comprising a second resistor connecting said detector output terminal to said second comparator input terminal and a third resistor connecting said second comparator input terminal to ground.

7. A peak detector according to claim 6, further defined by said clipper comprising a diode and fourth and fifth resistors, the anode of said diode connected to said signal input terminal and said fourth resistor connecting the cathode thereof to the first comparator input terminal, said fifth resistor connected between said first comparator input terminal and ground.

8. A peak detector according to claim 6, further defined by said differentiator comprising a capacitor coupling said signal input terminal to said second comparator input terminal.

9. A peak detector according to claim 7, further defined by said differentiator comprising a capacitor coupling said signal input terminal to said second comparator input terminal.

\* \* \* \* \*